3,341,560
6 - MONOFLUOROMETHYL - 17α - HYDROXYPROGESTERONES AND 17-ACYLATES THEREOF
J Allen Campbell and John E. Pike, Kalamazoo, Mich., assignors to The Upjohn Company, Kalamazoo, Mich., a corporation of Michigan
No Drawing. Continuation of application Ser. No. 143,567, Oct. 9, 1961. This application May 22, 1963, Ser. No. 282,213
2 Claims. (Cl. 260—397.4)

This application is a continuation of our copending application S.N. 143,567, filed October 9, 1961 and now abandoned. This invention relates to certain novel steroids, more particularly to 6α-fluoromethyl-17α-hydroxy-5α-pregnane-3,20-dione 17-acylates, 1-dehydro-6α-fluoromethyl-17α-hydroxy-5α-pregnane-3,20-dione 17-acylates, 6α-fluoromethyl-17α-hydroxy-4-pregnene-3,20-dione 17-acylates, 6α-fluoromethyl-17α-hydroxy-1,4-pregnadiene-3,20-dione 17-acylates, 6-fluoromethyl-17α-hydroxy-4,6-pregnadiene-3,20-dione 17-acylates, 6-fluoromethyl-17α-hydroxy-1,4,6-pregnatriene-3,20-dione 17-acylates and the unacylated 17α-hydroxy compounds corresponding otherwise thereto.

The compounds of the present invention and processes for their production are illustratively represented by the following sequence of formulae:

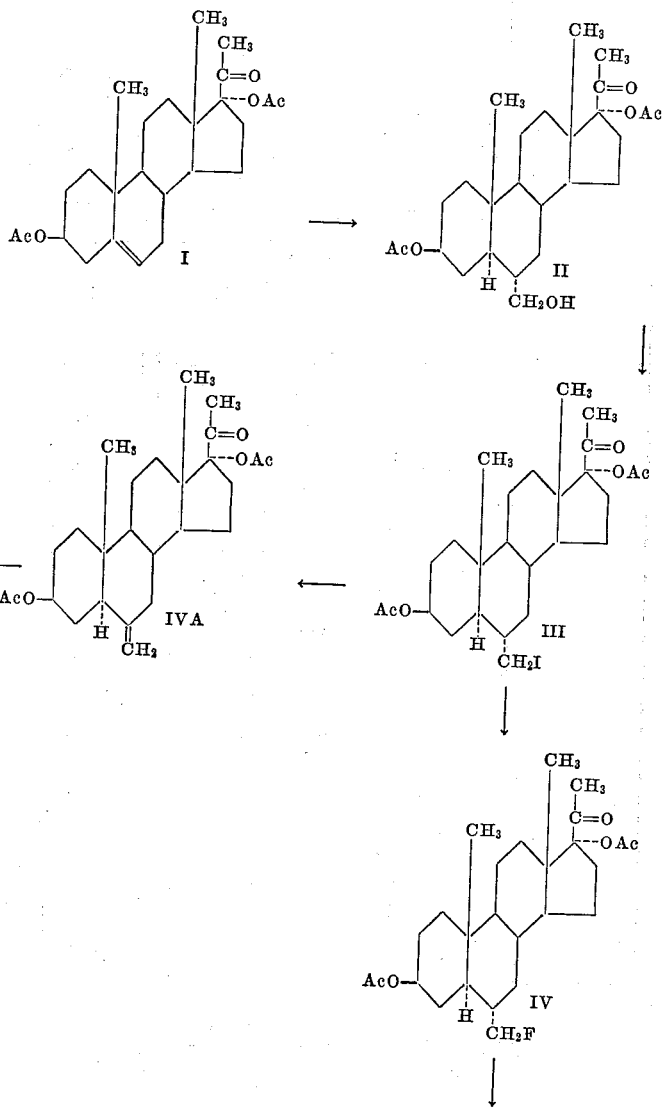

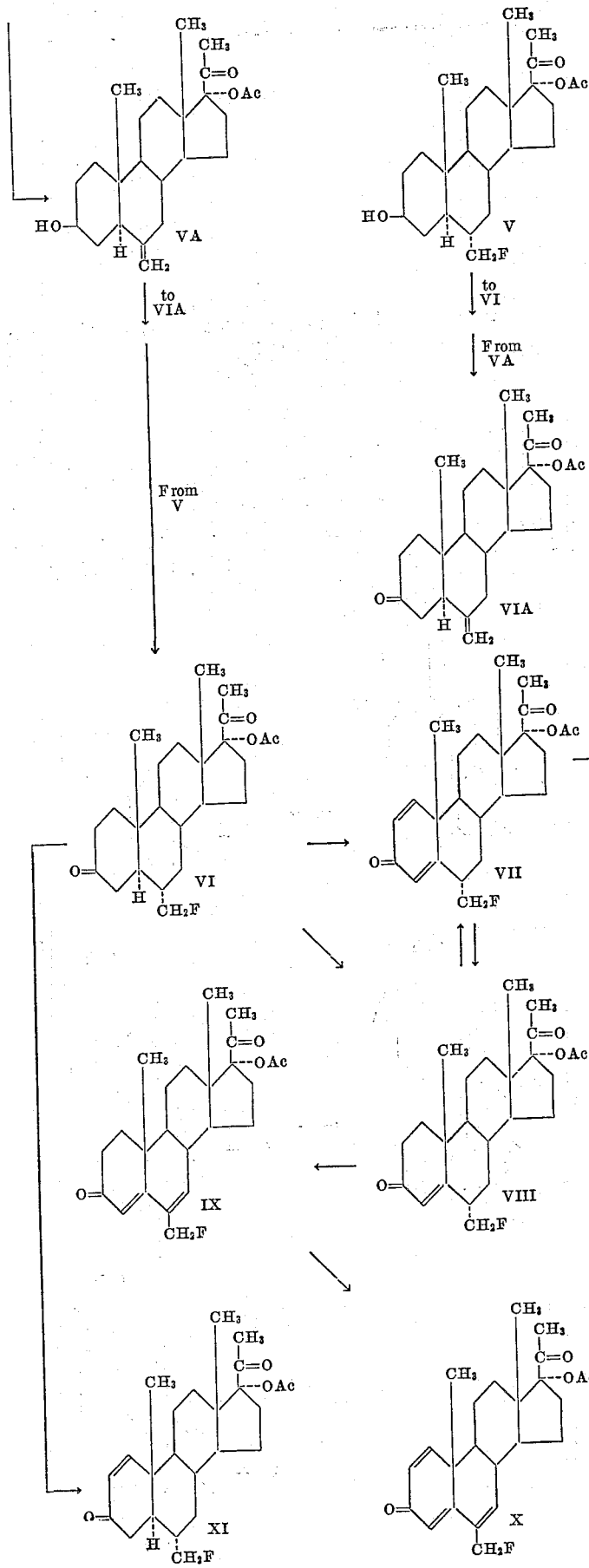

wherein Ac is the acyl radical of an organic carboxylic acid, preferably a hydrocarbon carboxylic acid containing from one to twelve carbon atoms, inclusive.

As used in this application, the Roman numeral following the name of a compound (or compounds) indicates the relation of the compound (or compounds) to the reaction scheme depicted above.

The novel compounds of this invention, 6α-hydroxymethyl-3β,17α - dihydroxy - 5α - pregnan-20-one 3,17-diacylates (II), 6α-fluoromethyl-3β,17α-dihydroxy-5α-pregnan-20-one 3,17-diacylates (IV), 6-methylene-3β,17α-dihydroxy-5α-pregnan-20-one 3,17-diacylate (IVA), 6α-fluoromethyl-3β,17α-dihydroxy - 5α - pregnan-20-one-17-acylate (V), 6-methylene-3β,17α-dihydroxy-5α-pregnan-20-one 17-acylate (VA), 6α-fluoromethyl-17α-hydroxy-5α-pregnane-3,20-dione 17-acylates (VI), 1-dehydro-6α-fluoro - methyl-17α-hydroxy-5α-pregnane-3,20-dione 17-acylates (XI), 6α-fluoromethyl-17α-hydroxy-4-pregnene-3,20-dione 17-acylates (VIII), 6α-fluoromethyl-17α-hydroxy-1,4-pregnadiene-3,20-dione 17-acylates (VII), 6-fluoromethyl-17α-hydroxy-4,6-pregnadiene-3,20-dione 17-acylates (IX), 6-fluoromethyl-17α-hydroxy-1,4,6-pregnatriene-3,20-dione 17-acylates (X) and the unacylated 17α-hydroxy compounds corresponding otherwise thereto, are highly potent progestational agents, active both orally and parenterally. The compounds represented by Formulae II and IV to XI, inclusive, are therefore useful as progestational agents in the treatment of humans and valuable domestic animals. They are advantageously employed in the control of such conditions as functional uterine bleeding and dysmenorrhea; they are useful in the maintenance of pregnancy and the regulation of fertility. The compounds embraced by Formulae II and IV to XI, inclusive, have an improved therapeutic ratio and are useful as anti-hormonal agents, particularly as anti-estrogens and anti-gonadotropins. They are also effective in the treatment of acne. For these purposes, the compounds of this invention can be incorporated and administered to mammals, birds, humans and animals in the various conventional dosage forms, such as pills, tablets, capsules, syrups or elixirs for oral use, or in liquid forms such as suspensions and solutions which are adaptable to the natural and synthetic steroid hormones for injectable products. 6α-fluoromethyl-17α-hydroxy-1,4-pregnadiene-3,20-dione 17-acetate (VII) has been found to be several times as active as 6α-methyl-17α-hydroxy-4-pregnene - 3,20 - dione 17-acetate (Provera) when tested for oral progestational activity by the standard McPhail assay.

The novel compounds of the present invention are prepared from the known 3β,17α-dihydroxy-5-pregnen-20-one 3,17-diacylates (I) by the following reactions: The 5-pregnene compounds (I) are hydroxymethylated at the 6-position of the nonconjugated double bond by reacting said compounds under conventional "oxo" reaction conditions with carbon monoxide and hydrogen in the presence of a suitable catalyst under pressure to produce a 6α-hydroxymethyl-3β,17α-dihydroxy-5α-pregnan - 20 - one 3,17-diacylate (II).

The next step of the process of this invention involves reacting a 6α-hydroxymethyl-3β,17α-dihydroxy-5α-pregnan-20-one 3,17-diacylate (II) with a halogenating agent such as triphenylphosphite methiodide, triphenylphosphite hydrochloride or triphenylphosphite hydrobromide to produce a corresponding 6-halomethyl steroid compound such as a 6α-iodomethyl-3β,17α-dihydroxy-5α-pregnan-3-one 3,17-diacylate (III).

The thus produced 6α-iodomethyl-3β,17α-dihydroxy-5α-pregnan-3-one 3,17-diacylate (III) is reacted with silver fluoride to yield a mixture of a 6α-fluoromethyl-3β-17α-dihydroxy-5α-pregnan-20-one 3,17-diacylate (IV) and a 6-methylene-3β,17α-dihydroxy-5α-pregnan-20-one 3,17-diacylate (IVA).

The next step of the process is one employing conventional reagents and conditions in which the above-produced mixture of a 6α-fluoromethyl-3β,17α-dihydroxy-5α-pregnan-20-one 3β,17α-diacylate (IV) and a 6-methylene-3β, 17α-dihydroxy-5α-pregnan - 20 - one 3β,17α-diacylate (IVA) undergoes hydrolysis at the 3-position by reacting with a strong mineral acid in an alkanol, e.g., concentrated sulfuric acid in absolute ethanol or concentrated hydrochloric acid in methanol, to yield a mixture of a 6α-fluoromethyl-3β,17α-dihydroxy-5α-pregnan-20-one-17-acylate (V) and a N-methylene 3β,17α-dihydroxy-5α-pregnan-20-one 17-acylate (VA). The compounds of V and VA are separated from each other by methods well known in the steroid art, e.g., by chromatography and crystallization.

In the next step of the process, oxidation at the 3-position of the compounds represented by Formulae V and VA results in the conversion of the 3β-hydroxy substituent to a keto group. Oxidation of the aforesaid compounds (V and VA) is carried out with, e.g., sodium dichromate in acetic acid or chromic acid in glacial acetic acid or acetone, or under conventional Oppenauer conditions employing an aluminum alkoxide, e.g., aluminum isopropoxide in the presence of a ketone such as acetone or cyclohexanone, to give a mixture of the corresponding 6α-fluoromethyl - 17α - hydroxy - 5α - pregnane - 3,20-dione 17-acylates (VI) and 6-methylene-17α-hydroxy-5α-pregnane-3,20-dione 17-acylates (VIA), which can be readily separated by gradient elution chromatography.

The step of converting the 6α-fluoromethyl-17α-hydroxy-5α-pregnane-3,20-dione 17-acylates (VI) to 6α-fluoromethyl-17α-hydroxy-1,4-pregnadiene-3,20-dione 17-acylates (VII) can be carried out by several methods, namely by reacting a compound represented by Formula VI, with a reagent chosen from the group comprising (1) selenium dioxide; (2) dibenzoyloxy selenium oxide in the manner disclosed in German Patent 1,079,630; (3) selenium dioxide in the presence of a metal of the second or eighth group of the periodic system, e.g., magnesium, zinc, cadmium, mercury of Group II or iron, cobalt, nickel of Group VIII as disclosed in U.S. Patent 2,900,398; (4) 2,4-dihalogenating agents, e.g., bromine (2 equivalents) in a medium made acid with hydrobromic acid followed by dehydrohalogenation, e.g., with lithium chloride and dimethylformamide or with γ-collidine as disclosed in U.S. Patent 2,838,531 and (5) periodic acid in accordance with the procedure set forth in German Patent 1,042,580.

6α - fluoromethyl - 17α - hydroxy-1,4-pregnadiene-3,20-dione 17-acylates (VII) can also be prepared (in the manner disclosed by Vischer et al. In Experientia IX, 371 [1953]) by growing a microorganism selected from the genus Fusarium, e.g., Fusarium solani and Fusarium caucasicum, in a nutrient medium containing assimilable non-steroidal carbon, nitrogen and phosphorus, and a compound represented by Formula VI.

6α-fluoromethyl-17α-hydroxy-5α-pregnane-3,20 - dione 17-acylates (VI) can be converted to the corresponding 1-dehydro-6α-fluoromethyl-17α-hydroxy-5α-pregnane - 3, 20-dione 17-acylates (XI) by reaction with a 2-halogenating agent, e.g., bromine (1 equivalent), followed by dehydrohalogenation, e.g., with lithium chloride and dimethylformamide or with γ-collidine.

The compounds represented by Formula VI can be converted to 6α-fluoromethyl-17α-hydroxy-4-pregnene-3, 20-dione 17-acylates (VIII) by 2,4-dihalogenation, e.g., with bromine (2 equivalents) in an acidic medium, followed by dehydrohalogenating the thus obtained 2,4-dihalo compound with sodium iodide. Alternatively, 6α-fluoromethyl - 17α - hydroxy - 4 - pregnene - 3,20-dione 17-acylates (VIII)) can be prepared (in the manner disclosed by Stoudt et al. in Arch. Biochem, and Biophys. 74, 280 [1958]) by growing a microorganism of the genus Nocardia in a nutrient medium containing non-steroidal carbon, nitrogen and phosphorus, and a compound represented by Formula VI.

6α - fluoromethyl - 17α - hydroxy - 4 - pregnene - 3,20-dione 17-acylates (VIII) can be converted to the corresponding 6α - fluoromethyl - 17α - hydroxy - 1,4-pregnadiene-3,20-dione 17-acylates (VII) by fermentation (in the manner set forth in U.S. Patent 2,902,410) with a microorganism of the genus Septomyxa in a nutrient medium containing non-steroidal carbon, nitrogen and phosphorus. Following the same procedure, other microorganisms can be employed instead of Septomyxa; the family Cornybacteriaceae inclusive of the genera Cornybacterium, Listeria and Erysipelothrix, especially the species Cornybacterium simplex (ATCC 6946) and Cornybacterium hoagii (ATCC 7005), can be used in the 1-dehydrogenation of the compounds embraced by Formula VIII. Alternatively, the compounds represented by Formula VIII can be converted to those of Formula VII by heating at refluxing temperature in a suitable solvent with selenium dioxide, or selenium dioxide in the presence of a metal of the second or eighth group of the periodic system in the manner of U.S. Patent 2,900,398.

The 17α-hydroxy counterpart of the 6α-fluoromethyl-17α-hydroxy-1,4-pregnadiene-3,20 - dione 17 - acylates (VII) can be hydrogenated at the 1,2-position by fermentation with a microorganism chosen from the group including ATCC 6947 (Arthrobactertumescens), NRRL–B–1332, ATCC 3352 (S. olivaceous) and ATCC 3313 (S. cellulosae) to yield the compounds of Formula VIII. The 17-acylates of Formula VII are preferably first hydrolyzed to the corresponding 17α-hydroxy compound (VIIa), e.g., with sodium hydroxide in methanol, before being subjected to the fermentative 1,2-hydrogenation. The 17-acyl group is restored following bioconversion by esterifying the 17α-hydroxy compound (VIIIa) with (in the manner set forth in U.S. Patent 2,965,541) the selected anhydride in the presence of an acid catalyst, e.g., p-toluenesulfonic acid, to yield a 6α-fluoromethyl - 17α - hydroxy - 4 - pregnene - 3,20 - dione 17-acylate (VIII).

By following the procedure of Example 1 of U.S. Patent 2,889,342, 6α - fluoromethyl - 17α - hydroxy - 4-pregnene-3,20-dione (VIIIa) can be converted to 3,17α-diacyloxy-6α-fluoromethyl-3,5-pregnadien-20-ones and 3,17α - 20 - triacyloxy - 6α - fluoromethyl - 3,5,20 - pregnatrienes. 6α-fluoromethyl-17α-hydroxy-4-pregnene - 3,20-dione 17α - acylates (VIII) can be converted to 3,17α - diacyloxy - 6α - fluoromethyl - 3,5 - pregnadien-20-ones and 3,17α,20-triacyloxy-6α-fluoromethyl-3,5,20-pregnatrienes in accordance with the procedure of Example 2 of U.S. Patent 2,889,342.

The 6α - fluoromethyl - 17α - hydroxy - 4 - pregnene-3,20-dione 17-acylates (VIII) can be converted to their corresponding 6-dehydro analogues, i.e., 6α-fluoromethyl-17α-hydroxy-4,6-pregnadiene-3,20-dione 17-acylates (IX) by heating under reflux with chloranil for a period of from about six to about twenty four hours.

The compounds of Formula IX can be converted to 3,17α - diacyloxy - 6α - fluoromethyl - 3,5,7 - pregnatriene-20 - ones and 3,17α,20 - triacyloxy - 6α - fluoromethyl-3,5,7,20-pregnatetraenes by following the procedure of Example 2 of U.S. Patent 2,889,342.

The 17α-hydroxy counterpart of the 6α-fluoromethyl-17α - hydroxy - 4,6 - pregnadiene - 3,20 - dione 17-acylates (IX) can be dehydrogenated at the 1,2-position by fermentation with a microorganism of the genus Septomyxa in a nutrient medium containing non-steroidal carbon, nitrogen and phosphorus. The 17-acyl group of the compounds of Formula IX are first hydrolyzed to the corresponding 17α-hydroxy compound (IXa), e.g., with sodium hydroxide in methanol, before being subjected to the fermentative 1,2-dehydrogenation. The 17-acyl group is restored following bioconversion by esterifying the 17α-hydroxy compound (Xa) with the selected anhydride in the presence of an acid catalyst, e.g., p-toluenesulfonic acid, to yield a 6-fluoromethyl-17α-hydroxy-1,4,6-pregnatriene-3,20-dione 17-acylate (X) as in U.S. Patent 2,965,541. Alternatively, the compounds represented by Formula IX can be converted to those of Formula X by heating at refluxing temperature in a suitable solvent with selenium dioxide, or selenium dioxide in the presence of a metal of the second or eighth group of the periodic system (in the manner of U.S. Patent 2,900,398).

The 1,4,6-pregnatriene compounds represented by Formula X can also be produced from 6α-fluoromethyl-17α-hydroxy - 1,4 - pregnadiene - 3,20 - dione 17-acylates (VII) by heating under reflux with chloranil for a period of from about six to about twenty four hours.

The starting compounds (I) employed in the present process are obtained in the manner disclosed in Preparation 1A of U.S. Patent 2,916,486 by reacting the known 3β,17α-dihydroxy-5-pregnen-20-one (17α-hydroxypregnenelone) with an anhydride of a hydrocarbon carboxylic acid containing from one to twelve carbon atoms, inclusive, in the presence of p-toluenesulfonic acid to produce a 3β,17α-dihydroxy-5-pregnen-20-one 3,17-diacylate (I).

All of the 17-acylates embraced by Formulae VI through XI can be converted to the corresponding 17α-hydroxy compounds by saponification. For this purpose the particular 17-acylate is allowed to react in alcoholic solution at room temperature for a period of from about one to about 24 hours with an alkali metal hydroxide such as sodium hydroxide, potassium hydroxide; an alkali metal carbonate or bicarbonate such as sodium or potassium carbonate, sodium bicarbonate or the like; an alkaline earth metal hydroxide such as barium or calcium hydroxide.

To isolate the product from the reaction mixture, the latter is first neutralized with aqueous acetic, hydrochloric or sulfuric acid and diluted with water and extracted with a water-immiscible organic solvent such as methylene chloride, chloroform benezene, ether or the like, and the extracts dried and evaporated to give the crude material. The crude material can then be recrystallized from organic solvents such as methanol, ethanol, acetone, Skellysolve B (hexanes), ethyl acetate, methylene chloride or the like to give the pure 17α-hydroxy counterparts of the compounds represented by Formulae VI through XI. The 17-acylates of the thus obtained compounds are prepared by the esterification thereof, e.g., with the anhydride of the selected acid, in the manner for esterifying difficultly esterifiable 17α-hydroxy steroids disclosed in U.S. Patent 2,805,230, or in Huang-Minlon et al., J. Am. Chem., 74, 5394 (1952), i.e., by reacting a steroid containing a tertiary hydroxyl group in the 17α-position with the selected anhydride in the presence of an acid catalyst, e.g., p-toluenesulfonic acid.

All of the compounds embraced by Formulae I through XI can be isolated from their respective reaction mixtures by conventional means, for example, when a water-miscible solvent is used, by pouring the reaction mixture into water and separating the resultant precipitate by filtration. Additional purification of the product can be accomplished by conventional methods, for example, by elution chromatography from an adsorbent column with a mixture of suitable solvents, such as, acetone, methanol, dilute methanol, ethanol, ethylene chloride; also by gradient elution chromatography from an adsorbent column with a suitable mixture of solvents, such as, methylene chloride-Skellysolve B, acetone-Skellysolve B, and the like.

EXAMPLE 1

*6α-hydroxymethyl-3β,17α-dihydroxy-5α-pregnan-20-one 3,17-diacetate (II)*

A mixture of 125 g. of the known compound, 3β,17α-dihydroxy 5-pregnen-20-one 3β,17α-diacetate (I), 1875 ml. of toluene and 18.75 g. of cobalt carbonate catalyst was placed in a 1 gallon stainless steel autoclave equipped with a mechanical stirrer. The vessel was flushed three times with carbon monoxide and the pressure therein brought to 450 p.s.i. with carbon monoxide, then to 1150 p.s.i. with hydrogen and heated at 180° C. for a period of 18 hours. The reaction mixture was cooled and filtered through a bed of Celite (diatomaceous earth) and the clear yellow filtrate concentrated to dryness on a rotary separator. The residue was triturated with a mixture of ethyl acetate and ether and the crystals collected and washed with ether to yield 71.2 g. of product with a melting point of 225 to 231° C. An additional 4.6 g. was obtained from the mother liquor. A portion of the product was recrystallized from ethyl acetate to yield an analytical sample of 6α-hydroxy-methyl-3β,17α-dihydroxy-5α-pregnan-20-one 3,17-diacetate (II) having a melting point of 232 to 234° C. and a rotation [α]$_D$ of −1° (chloroform).

Analysis.—Calcd. for $C_{26}H_{40}O_6$ (448.58): C, 69.01; H, 8.99. Found: C, 69.64; H, 8.72.

EXAMPLE 2

6α-iodomethyl-3β,17α-dihydroxy-5α-pregnan-3-one 3,17-diacetate (III)

A suspension of 15 g. of 6α-hydroxymethyl-3β,17α-dihydroxy-5α-pregnan-20-one 3,17-diacetate (II) and 20 g. of triphenyl-phosphite methiodide in 30 ml. of methyl iodide was heated at refluxing temperature for a period of about 2 hours or about one hour longer than the formation of a clear solution. Most of the solvent was evaporated leaving a dark syrup. The syrup was diluted with a mixture of methylene chloride and ether and washed successively with water, dilute sodium thiosulfate, additional water and dried. The solvent was removed with a rotary evaporator to give a light-colored oil. Addition of methanol to the oil precipitated the product which was collected on a filter, washed with a small amount of methanol and dried to yield 12.3 g. of material melting at 202 to 204° C. An analytical sample was obtained by recrystallization of the product from a mixture of acetone and Skellysolve B (hexanes) to yield 6α-iodomethyl-3β,17α-dihydroxy-5α-pregnan-3-one 3,17-diacetate (III) with a melting point of 201 to 205° C. and a rotation [α]$_D$ of +28° (chloroform).

Analysis.—Calcd. for $C_{28}H_{39}O_5I$: C, 55.91; H, 7.04; I, 22.72. Found: C, 56.37; H, 7.04; I, 20.64.

EXAMPLE 3

(a) 6α-fluoromethyl-3β,17α-dihydroxy-5α-pregnan-20-one 3,17-diacetate (IV)

(b) 6-methylene-3β,17α-dihydroxy-5α-pregnan-20-one 3,17-diacetate (IVA)

A solution of silver fluoride was prepared in a polyethylene bottle by condensing 26 g. of hydrogen fluoride, adding 200 ml. of acetonitrile and then adding an excess of silver oxide, filtering off the unreacted silver oxide and recovering the clear silver fluoride solution. 190 ml. of the thus prepared silver fluoride solution mixed with 12 g. of 6α-iodomethyl-3β,17α-dihydroxy-5α-pregnan-3-one 3,17-diacetate (III) was stirred at room temperature for a period of about one-half hour and then heated at refluxing temperature for a period of about 2 hours. Most of the solvent was evaporated off with a stream of nitrogen. The remaining concentrated material was diluted with water and extracted thoroughly with methylene chloride. The extracts were pooled, washed with water, dried and concentrated to dryness. The partly crystalline residue was a mixture of 6α-fluoromethyl-3β,17α-dihydroxy-5α-pregnan-20-one 3,17-diacetate (IV) and 6-methylene-3β,17α-dihydroxy-5α-pregnan-20-one 3,17-diacetate (IVA). The compounds of IV and IVA were separated from each other by conventional means, e.g., by chromatography and crystallization.

EXAMPLE 4

(a) 6α-fluoromethyl-3β-dihydroxy-5α-pregnan-20-one 17-acetate (V)

(b) 6-methylene-3β,17α-dihydroxy-5α-pregnan-20-one 17-acetate (VA)

About 9 g. of the crude mixed products, 6α-fluoromethyl-3β,17α-dihydroxy-5α-pregnan-20-one 3,17-diacetate (IV) and 6-methylene-3β,17α-dihydroxy-5α-pregnan-20-one, 3,17-diacetate (IVA) (obtained in Example 3), were dissolved in 200 ml. of methanol and 2 ml. of concentrated hydrochloric acid and refluxed for a period of about an hour under a stream of nitrogen. Part of the methanol was evaporated with nitrogen, and water added to cause precipitation. The precipitate was separated by filtration, washed with water and dried to yield 8 g. of a mixture of 6α-fluoromethyl-3β-17α-dihydroxy-5α-pregnan-20-one 17-acetate (V) and 6-methylene-3β,17α-dihydroxy-5α-pregnan-20-one 17-acetate (VA). The compounds of V and VA were separated from each other by conventional means, e.g., by chromatography and crystallization.

EXAMPLE 5

(a) 6α-fluoromethyl-17α-hydroxy-5α-pregnane-3,20-dione 17-acetate (VI)

(b) 6-methylene-17α-hydroxy-5α-pregnane-3,20-dione 17-acetate (VIA)

8 g. of the crude mixed products, 6α-fluoromethyl-3β,17α-dihydroxy-5α-pregnan-20-one 17-acetate (V) and 6-methylene-3β,17α-dihydroxy-5α-pregnan-20-one 17-acetate (VA) (obtained in Example 4), were added to a solution of 8 g. of sodium dichromate dihydrate in 70 ml. of acetic acid. After a period of about 5½ hours, the reaction mixture was poured into water and the resulting precipitate filtered, washed with water and sucked nearly dry. The precipitate was dissolved in methylene chloride and the organic phase separated and dried over magnesium sulfate. The methylene chloride solution was adsorbed on a column of 300 g. of Florisil (synthetic magnesium silicate) and the column extracted by gradient elution chromatography employing 4 l. of 4% acetone in Skellysolve B and 4 l. or 10% acetone in Skellysolve B. The residues obtained from the evaporation of fractions 11 to 19 (400 ml. each) contained the 6-methylene compound (VIA). Recrystallization of the combined residues gave 2 g. of product melting at 208 to 210° C. An analytical sample was obtained by recrystallization from a mixture of acetone and Skellysolve B, provided pure 6-methylene-17α-hydroxy-5α-pregnane-3,20-dione 17-acetate (VIA) with a melting point of 213 to 215.5° C. and rotation [α]$_D$ of −24° (chloroform).

Analysis.—Calcd. for $C_{24}H_{34}O_4$: C, 74.57; H, 8.87. Found: C, 74.16; H, 8.91.

The 6α-fluoromethyl compound (VI) was eluted in fractions 23 to 29. These fractions were pooled and evaporated; the combined residues on recrystallization gave 2 g. of product with a melting point of 172 to 175° C. An analytical sample was obtained by recrystallization from a mixture of acetone and Skellysolve B, providing pure 6α-fluoromethyl-17α-hydroxy-5α-pregnane-3,20-dione 17-acetate (IV) with a melting point of 175 to 176° C.

Analysis.—Calcd. for $C_{24}H_{35}FO_4$: C, 70.90; H, 8.68; F, 4.67. Found: C, 71.08; H, 8.88; F, 4.59.

EXAMPLE 6

6α-fluoromethyl-17α-hydroxy-1,4-pregnadiene-3,20-dione 17-acetate (1-dehydro - 6α - fluoromethyl-17α-hydroxyprogesterone 17-acetate) (VII)

A mixture of 2 g. of 6α-fluoromethyl-17α-hydroxy-5α-pregnane-3,20-dione 17-acetate (VI), 2.6 g. of selenium dioxide, 3.1 g. of mercury and 5.2 ml. of acetic acid was suspended in 190 ml. of t-butyl alcohol and stirred with heating at refluxing temperature under nitrogen for a period of about 48 hours. The reaction mixture was concentrated to a volume of about 75 ml., diluted with methylene chloride and filtered through a bed of Celite. The clear filtrate was washed twice with each of the following: freshly prepared ammonium sulfide solution, dilute ammonia solution and water. Each aqueous phase was back extracted with methylene chloride. The combined methylene chloride extracts were dried over magnesium sulfate, filtered and concentrated to a volume of about 20 ml. The concentrate was adsorbed on a column of 200 g. of Florisil and the column extracted by gradient elution chromatography employing 4 l. volumes of solvent mixtures of acetone and Skellysolve B ranging in concentration from 8% acetone in Skellysolve B to 18% acetone in Skellysolve B. Fractions of 400 ml. each were collected. Fractions 10 and 11 gave a few milligrams of by-product which by infrared spectral analysis was identified as 1-dehydro-6α-fluoromethyl - 17α - hydroxy-5α-pregnane-3,20-dione 17-acetate (XI);

$$\lambda_{max.}^{alc.}\ 229\ m\mu\ (\epsilon=9,125)$$

Fractions 14 to 21 contained the main product and were combined; concentration of these eluates followed by crystallization and recrystallization from a mixture of acetone and Skellysolve B yielded 0.4 g. of material melting at 250 to 255° C. Recrystallization of this material from the same solvent system provided an analytical sample of pure 6α-fluoromethyl-17α-hydroxy-1,4-pregnadiene-3,20-dione 17-acetate (VII) with a melting point of 252 to 255° C., $[\alpha]_D$ of $+6°$ and $\lambda_{max.}^{alc.}$ 243 m$\mu$ ($\epsilon=9,125$)

*Analysis.*—Calcd. for $C_{24}H_{31}FO_4$: C, 71.61; H, 7.76; F, 4.72. Found: C, 71.51; H, 7.64; F, 5.15.

EXAMPLE 6A

*6α-fluoromethyl-17α-hydroxy-1,4-pregnadiene-3,20-dione 17-acetate (VII)*

A mixture of 1 g. of 6α-fluoromethyl-17α-hydroxy-5α-pregnane-3,20-dione 17-acetate (VI), 20 ml. of t-butanol and 1.5 g. of dibenzoyloxy selenium oxide was heated with a water trap and reflux condenser for a period of about 12 hours. After cooling, the selenium compound was removed by filtration and the filtrate evaporated under vacuum. The residue was taken up in ethyl acetate, the extract washed with aqueous sodium carbonate solution, water and dried with wood charcoal. The extract was chromatographed over a 125 g. column of Florisil and eluted with fractions of Skellysolve B containing increasing portions of acetone. The fractions containing product showing ultra-violet absorption at 243 m$\mu$ were combined, evaporated to dryness and thus obtained residue recrystallized twice from methanol to yield pure light-colored crystalline 6α-fluoromethyl-17α-hydroxy-1,4-pregnadiene-3,20-dione 17-acetate (VII).

EXAMPLE 7

*6α-fluoromethyl-17α-hydroxy-1,4-pregnadiene-3,20-dione 17-acetate (VII)*

A solution containing 320 mg. of bromine in 15 ml. of glacial acetic acid was added with slow stirring to 410 mg. of 6α-fluoromethyl-17α-hydroxy-5α-pregnane-3,20 - dione 17-acetate (VI), dissolved in 300 ml. of acetic acid to which was added 0.1 ml. of 4 N hydrogen bromide solution in acetic acid. The mixture was allowed to stand overnight and resulted in the precipitation of a crude product which was recovered by filtration, washed with water and dried. The crude material was recrystallized from a mixture of ethyl acetate and Skellysolve B to give pure light-colored 2,4-dibromo-6α-fluoromethyl-17α-hydroxy-5α-pregnane-3,20-dione 17-acetate (VI'). A solution of 100 mg. of the thus obtained 2,4-dibromo compound (VI') in 1 ml. of redistilled dimethylformamide and 100 mg. of lithium chloride was heated for a period of about 2 hours. The reaction mixture was then cooled, poured into cold water and the aqueous solution extracted with methylene chloride. The methylene chloride extract was washed thoroughly with water, dried over anhydrous sodium sulfate and concentrated in volume. The extract was chromatographed over a 25 g. column of Florisil and eluted with fractions of Skellysolve B containing increasing proportions of acetone. The fractions showing an ultraviolet absorption at $$\lambda_{max.}^{alc.}\ 243\ m\mu$$

were combined, evaporated to dryness and the thus obtained residue recrystallized twice from methanol to give pure light-colored 6α-fluoromethyl-17α-hydroxy-1,4-pregnadiene-3,20-dione 17-acetate (VII).

The following procedure sets forth an alternative method of dehydrohalogenating the 2,4-dibromo compound (VI'). 100 mg. of 2,4-dibromo-6α-fluoromethyl-17α-hydroxy-5α-pregnane-3,20-dione 17-acetate (VI') was dissolved in 1 ml. of redistilled γ-collidine and the solution refluxed for a period of about 40 minutes. The reaction solution was then poured into sufficient cold dilute sulfuric acid to bind the base as the sulfate salt, and extracted with methylene chloride. The methylene chloride extract was chromatographed over a 25 g. column of Florisil using Skellysolve B containing increasing proportions of acetone for elution of the column. The fractions exhibiting ultraviolet absorption maxima at 243 m$\mu$ were combined and crystallized to yield pure light colored 6α fluoromethyl - 17α - hydroxy-1,4-pregnadiene-3,20-dione 17-acetate (VII).

EXAMPLE 7A

*6α-fluoromethyl-17α-hydroxy-1,4-pregnadiene-3,20-dione 17-acetate (VII)*

1 g. of 6α-fluoromethyl-17α-hydroxy-5α-pregnane-3,20-dione 17-acetate (VI) was dissolved in 65 ml. of t-amyl alcohol and 3 ml. of glacial acetic acid. To this solution, 400 mg. of periodic acid was added with stirring and heated to about 70° C. After this, during 30 minute intervals, four additional portions of 400 mg. of periodic acid were added to the reaction mixture with stirring and maintenance of the temperature at about 70° C. Heating was continued at this temperature for a period of about 20 hours. The reaction mixture was diluted with 65 ml. of water and 3 g. of sodium sulfate added. The t-amyl alcohol was removed under vacuum and the residue extracted with chloroform. The extract was washed with water, dried over sodium sulfate, heated to dryness on the water bath under vacuum and the solid material taken up in acetone. Recrystallization of the product from acetone yielded pure light-colored crystalline 6α-fluoromethyl-17α-hydroxy-1,4 - pregnadiene - 3,20-dione 17-acetate (VII).

EXAMPLE 7B

*6α-fluoromethyl-17α-hydroxy-1,4-pregnadiene-3,20-dione 17-acetate (VII)*

Six 100-milliliter portions of a medium in 250-milliliter Erlenmeyer flasks containing one percent glucose, two percent corn steep liquor (60 percent solids) and tap water was adjusted to a pH of 4.0. This medium was sterilized for 45 minutes at fifteen pounds per square inch pressure and inoculated with a one to two days growth of *Fusarium solani* A.T.C.C.11712. The Erlenmeyer flasks were shaken at room temperature at about 24 degrees centigrade for a period of three days. At the end of this period, this 600-milliliter volume was used as an inoculum for ten liters of the same glucose-corn steep liquor medium which in addition contained ten milliliters of an antifoam (a mixture of lard oil and octadecanol). The fermentor was placed into the water bath, adjusted to 28 degrees centigrade, and the contents stirred (300 r.p.m.) and aerated (0.5 l. air/10 l. beer). After 17 hours of incubation, when a good growth developed and the alkalinity rose to pH 6.7, two grams of 6α-fluoromethyl-17α-hydroxy-5α-pregnane-3,20-dione 17-acetate (VI) plus one gram of 3-ketobisnor-4-cholen-22-al, dissolved in 115 milliliters of dimethylformamide, was added and the incubation (conversion) carried out at the same temperature and aeration for 48 hours (final pH 7.9). The mycelium was filtered off and the steroidal material was extracted with methylene chloride, the methylene extracts evaporated to dryness, and the resulting residue chromatographed over a Florisil column. The column was packed with 200 grams of Florisil and was developed with five 400-milliliter fractions each of methylene chloride, Skellysolve B-acetone mixture of 9:1, 8:2, 7:3, 1:1 and methanol. The fraction eluted with Skellysolve B-acetone (7.3) on recrystallization from acetone gave the desired product, 6α-fluoromethyl-17α-hydroxy-1,4-pregnadiene-3,20-dione 17-acetate (VII).

Following the procedure of Example 7B, but instead of *Fusarium solani* A.T.C.C. 11712, employing *Fusarium solani* A.T.C.C. 10915 or *Fusarium caucasicum* No. 5978 of the Fungi Culture Collection of the Institute for Fermentation of Takeda Pharmaceutical Industries, Ltd., Osaka, Japan, is likewise productive of 6α-fluoromethyl-17α-hydroxy-1,4-pregnadiene-3,20-dione 17-acetate (VII).

EXAMPLE 8

*1-dehydro-6α-fluoromethyl-17α-hydroxy-5α-pregnane-3,20-dione 17-acetate (XI)*

A solution containing 160 mg. of bromine in 10 ml. of glacial acetic acid was added with slow stirring to 410 mg. of 6α-fluoromethyl-17α-hydroxy-5α-pregnane-3,20-dione 17-acetate (VI), dissolved in 300 ml. of acetic acid to which was added 0.1 ml. of 4 N hydrogen bromide solution in acetic acid. The mixture was allowed to stand overnight and resulted in the precipitation of a crude product which was recovered by filtration, washed with water and dried. The crude material was recrystallized from a mixture of ethyl acetate and Skellysolve B to give pure light-colored 2-bromo-6α-fluoromethyl-17α-hydroxy-5α-pregnane-3,20-dione 17α-acetate (VI″). A solution of 100 mg. of the thus obtained 2-bromo compound (VI″) in 1 ml. of redistilled dimethylformamide and 100 mg. of lithium chloride was heated for a period of about 2 hours. The reaction mixture was then cooled, poured into cold water and the aqueous solution extracted with methylene chloride. The methylene chloride extract was washed thoroughly with water, dried over anhydrous sodium sulfate and concentrated in volume. The extract was chromatographed over a 25 g. column of Florisil and eluted with fractions of Skellysolve B containing increasing proportions of acetone. The fractions showing an ultraviolet absorption at $$\gamma_{max.}^{alc.} \ 229 \ m\mu \ (\epsilon = 9,125)$$

were combined, evaporated to dryness and the thus obtained residue recrystallized twice from methanol to give pure light colored 1-dehydro-6α-fluoromethyl-17α-hydroxy-5α-pregnane-3,20-dione 17-acetate (XI).

The following procedure sets forth an alternative method of dehydrohalogenating the bromo compound (VI″). 100 mg. of 2-bromo-6α-fluoromethyl-17α-hydroxy-5α-pregnane-3,20-dione 17-acetate (VI″) was dissolved in 1 ml. of redistilled γ-collidine and the solution refluxed for a period of about 40 minutes. The reaction solution was then poured into sufficient cold dilute sulfuric acid to bind the base as the sulfate salt, and extracted with methylene chloride. The methylene chloride extract was chromatographed over a 25 g. column of Florisil using Skellysolve B containing increasing proportions of acetone for elution of the column. The fractions exhibiting ultraviolet absorption maxima at 229 mμ (ε=9,125) were combined and crystallized to yield pure light colored 1-dehydro-6α-fluoromethyl-17α-hydroxy-5α-pregnane-3,20-dione 17-acetate (XI).

EXAMPLE 9

*6α-fluoromethyl-17α-hydroxy-4-pregnene-3,20-dione 17-acetate (VIII)*

410 mg. of 6α-fluoromethyl-17α-hydroxy-5α-pregnane-3,20-dione 17-acetate (VI) in 10 ml. of dioxane was acidified with a drop of 4 N hydrogen bromide in dioxane and 320 mg. of bromine added over a period of 1 minute. After a period of about 1 hour at room temperature, an excess of sodium bicarbonate solution was added to the reaction mixture. The precipitated 2,4-dibromo derivative of 6α-fluoromethyl-17α-hydroxy-5α-pregnan-3,20-dione 17-acetate (VI′) was treated with 0.9 g. of sodium iodide in 15 ml. of acetone containing bromoacetone, and the mixture heated at refluxing temperature for a period of about 2.5 hours. 0.3 g. of oxalic acid was then added and heating continued for a period of about 1 hour. After cooling, ethyl acetate was added and the solution filtered. The filtrate was washed with water and sodium bicarbonate solution, then dried with sodium sulfate. The filtrate was stirred with 500 mg. of zinc dust in 2 ml. of acetic acid for about 1 hour and then filtered. The organic layer was washed successively with water, sodium bicarbonate solution and dried with sodium sulfate. Evaporation of the solvent gave the crude α,β-unsaturated ketone, which on purification with the Girard reagent, followed by subsequent crystallization yielded pure light colored 6α-fluoromethyl-17α-hydroxy-4-pregnene-3,20-dione 17-acetate (VIII). Alternatively, if desired, the crude α,β-unsaturated ketone can be purified by chromatography over Florisil with increasing proportions of acetone is Skellysolve B, followed by recrystallization.

EXAMPLE 10

*6α-fluoromethyl-17α-hydroxy-4-pregnane-3,20-dione 17-acetate (VIII)*

A medium consisting of 1% dextrose hydrate, 2% cornsteep liquor of 60% solids and tap water was adjusted to pH 4.9 with sodium hydroxide. The medium was steam sterilized at 15 pounds pressure for about 30 minutes, cooled and then inoculated with a 24 hour growth, from spores, of *Nocardia blackwellii* (NCTC 630 [Medical Research Council of the Lister Institute, London]). The medium was agitated and sparged with sterile air at the rate of one-tenth volume of air per volume of medium per minute. At the end of 24 hours of fermentation at room temperature, the pH was about 7.4. To this culture, there was added a solution of 6α-fluoromethyl-17α-hydroxy-5α-pregnane-3,20-dione 17-acetate (VI) dissolved in a minimal amount of dimethylformamide. The solution was prepared by dissolving 5 parts of the steroid in 100 parts of the solvent and adding about 10 ml. of the solution per liter of the medium. Fermentation was continued for a period of about 6 hours whereupon the mycelium and beer were extracted thoroughly with methylene chloride. The extract was washed with sodium bicarbonate solution and then with water, dried and concentrated under vacuum to give 6α-fluoromethyl-17α-hydroxy-4-pregnene-3,20-dione (VIIIa).

Instead of *Nocardia blackwellii* (NCTC 630 [Medical Research Council of the Lister Institute, London]) used in Example 10 to produce fermentative dehydrogenation at the 4,5-position, other microorganisms may be similarly effectively employed; included are those chosen from the group consisting of: ATCC 4275 (*Nocardia convoluta*); ATCC 9604 (*Nocardia gardneri*) and NRRL B-1365 (*Nocardia coeliaca*).

A solution composed of 1 g. of 6α-fluoromethyl-17α-hydroxy-4-pregnene-3,20-dione (VIIIa), 2.5 ml. of distilled acetic anhydride, 250 mg. of p-toluenesulfonic acid and 2.5 ml. of acetic acid was stirred for a period of about 90 minutes. The mixture was poured with vigorous stirring into water. The precipitated solid was separated by filtration, dried, chromatographed over Florisil with increasing proportions of acetone in Skellysolve B and recrystallized from ethyl acetate to yield light-colored 6α-fluoromethyl-17α-hydroxy-4-pregnene-3,20-dione 17-acetate (VIII).

Substituting another lower-hydrocarbon carboxylic acid anhydride, for the acetic anhydride is productive of other 6α-fluoromethyl-17α-hydroxy-4-pregnene-3,20-dione 17-acylates (VIII) wherein the acyl radical of the acylate group is the acyl radical of, for example, a lower-aliphatic acid, e.g., formic (formic acid plus acetic anhydride), propionic, butyric, isobutyric, caproic, valeric, isovaleric, trimethylacetic, 2-methylbutyric, 3-ethylbutyric, hexanoic, diethylacetic, triethylacetic heptanoic, octanoic, α-ethylisovaleric, a cyclic acid, e.g., cyclopropylideneacetic, a cycloaliphatic acid, e.g., cyclopentylformic, cyclopentylacetic, β-cyclopentylpropionic, cyclohexylformic, cyclohexylacetic, β-cyclohexylpropionic, an aryl or alkaryl acid, e.g., benzoic, methylbenzoic, dimethylbenzoic, ethylbenzoic, trimethylbenzoic, α-naphthoic, 3-methyl-α-naphthoic, an aralkyl acid, e.g., phenylacetic, phenylpropionic, diphenylacetic, and triphenylacetic acid.

EXAMPLE 10A

*6α-fluoromethyl-17α-hydroxy-1,4-pregnadiene-3,20-dione 17-acetate (VII)*

Six 100-milliliter portions of a medium in 250-milliliter Erlenmeyer flasks containing one percent glucose, two percent corn steep liquor (60 percent solids) and tap water was adjusted to a pH of 4.9. This medium was sterilized for 45 minutes at fifteen pounds per square inch pressure and inoculated with a one to two day growth of *Septomyxa affinis* A.T.C.C. 6737. The Erlenmeyer flasks were shaken at room temperature at about 24 degrees centigrade for a period of three days. At the end of this period, this 600-milliliter volume was used as an inoculum for ten liters of the same glucose-corn steep liquor medium which in addition contained ten milliliters of an antifoam (a mixture of lard oil and octadecanol). The fermentor was placed into the water bath, adjusted to 28 degrees centigrade, and the contents stirred (300 r.p.m.) and aerated (0.5 l. air/10 l. beer). After 17 hours of incubation, when a good growth developed and the alkalinity rose to pH 6.7, two grams of 6α-fluoromethyl-17α-hydroxy-4-pregnene-3,20-dione 17-acetate (VIII) plus one gram of 3-ketobisnor-4-cholen-22-al, dissolved in 115 milliliters of dimethylformamide, was added and the incubation (conversion) carried out at the same temperature and aeration for 24 hours (final pH 7.9). The mycelium was filtered off and the steroidal material was extracted with methylene chloride, the methylene extracts evaporated to dryness, and the resulting residue chromatographed over a Florisil column. The column was packed with 200 grams of Florisil and was developed with five 400-milliliter fractions each of methylene chloride, Skellysolve B-acetone mixtures of 9:1, 8:2, 7:3, 1:1, and methanol. The fraction eluted with Skellysolve B-acetone (7:3) on recrystallization from acetone gave the desired product, 6α-fluoromethyl-17α-hydroxy-1,4-pregnadiene-3,20-dione 17-acetate (VII).

Instead of by fermentative dehydrogenation, 6α-fluoromethyl-17α-hydroxy-1,4-pregnadiene-3,20-dione 17-acetate (VII) or the corresponding 17-hydroxy compound can be obtained by dehydrogenation of 6α-fluoromethyl-17α-hydroxy-4-pregnene-3,20-dione 17α-acetate (VIII) or the corresponding 17-hydroxy compound with selenium dioxide as illustrated in Example 10B.

EXAMPLE 10B

*6α-fluoromethyl-17α-hydroxy-1,4-pregnadiene-3,20-dione 17-acetate (VII)*

Following the procedure of Example 10A, but employing *Corynebacterium simplex* (ATCC 6946) instead of *Septomyxa affinis*, is likewise productive of 6α-fluoromethyl-17α-hydroxy-1,4-pregnadiene-3,20-dione 17-acetate (VII).

EXAMPLE 10C

*6α-fluoromethyl-17α-hydroxy-1,4-pregnadiene-3,20-dione 17-acetate (VII)*

A mixture of seventy milligrams of 6α-fluoromethyl-17α-hydroxy-4-pregnene-3,20-dione 17-acetate (VIII) in 4.5 milliliters of tertiary butyl alcohol and 0.45 milliliter of acetic acid and 24 milligrams of selenium dioxide was heated to 75 degrees centigrade and stirred for 24 hours. Thereafter another 24-milligram portion of selenium dioxide was added and heated to 75 degrees centigrade and stirring continued. Thereafter the mixture was cooled, filtered to remove the selenium dioxide and evaporated. Paper chromatography showed the residue to obtain about fifty to 55 percent of 6α-fluoro-methyl-17α-hydroxy-1,4-pregnadiene-3,20-dione 17-acetate (VII) which is recovered from the residue by recrystallization and chromatography.

EXAMPLE 11

*6α-fluoromethyl-17α-hydroxy-4-pregnene-3,20-dione 17-acetate (VIII)*

A solution of 0.2 g. of 6α-fluoromethyl-17α-hydroxy-1,4-pregnadiene-3,20-dione 17-acetate (VII) in 5 ml. of 1% sodium hydroxide in 90% methanol and 2 ml. of methylene chloride was purged with nitrogen. After standing overnight at room temperature, the solution was diluted with methylene chloride and washed three times with water. The aqueous phases were back extracted with methylene chloride and washed three times with water. The extracts were combined, dried and concentrated to about 2 ml. and poured onto a 15 g. chromatographic column of Florisil. After washing the column with increasing amounts of acetone in Skellysolve B, the product was eluted with 2 to 8% acetone in 1:1 mixtures of Skellysolve B and methylene chloride. Recrystallization from a mixture of acetone and Skellysolve B yielded 65 mg. of 6α-fluoromethyl-17α-hydroxy-1,4-pregnadiene-3,20-dione (VIIa).

A medium consisting of 1% dextrose hydrate, 2% cornsteep liquor of 60% solids and tap water was adjusted to pH 4.9 with sodium hydroxide. The medium was steam sterilized at 15 pounds pressure for 30 minutes, cooled, and then inoculated with a 24-hour growth, from spores, of NRRL B–1332 (Streptomyces sp.). The medium was agitated, and sparged with sterile air at the rate of one-tenth volume of air per volume of medium per minute. At the end of 24 hours of fermentation at room temperature, the pH was about 7.4. To this culture there was added a solution of 6α-fluoromethyl-17α-hydroxy-1,4-pregnadiene-3,20-dione (VIIa) dissolved in a minimal amount of dimethylformamide. The solution was prepared by dissolving five parts of the steroid in 100 parts of the solvent and adding about 10 ml. of the solution per liter of the medium. Fermentation was continued for a period of 48 hours whereupon the mycelium and beer were extracted thoroughly with methylene chloride. The extract was washed with sodium bicarbonate solution and then with water, dried and concentrated in vacuo to give 6α-fluoromethyl-17α-hydroxy-4-pregnene-3,20-dione (VIIIa).

Instead of NRRL B–1332 used in Example 11 to produce fermentative hydrogenation at the 1,2-position of the steroid nucleus, other microorganisms may be similarly effectively employed; included are those chosen from the group consisting of: ATCC 6947 (Arthrobactertumescens); ATCC (*S. olivaceous*) and ATCC 3313.

A solution composed of 1 g. of 6α-fluoromethyl-17α-hydroxy-4-pregnene-3,20-dione (VIIIa), 2.5 ml. of distilled acetic anhydride, 250 mg. of p-toluenesulfonic acid and 2.5 ml. of acetic acid was stirred for a period of about 90 minutes. The mixture was poured with vigorous stirring into water. The precipitated solid was separated by filtration, dried, chromatographed over Florisil with increasing proportions of acetone in Skellysolve B and recrystallized from ethyl acetate to yield light-colored 6α-fluoromethyl - 17α - hydroxy - 4 - pregnene - 3,20 - dione 17-acetate (VIII).

Other 17-acylates are prepared in a like manner by substituting one of the lower-hydrocarbon carboxylic acid anhydrides listed in Example 10 in place of acetic anhydride.

EXAMPLE 11A 3,17α - diacetoxy - 6α - fluoromethyl - 3,5 - pregnadiene-20 - one and 3,17α - 20 - triacetoxy - 6α - fluoromethyl-3,5,20-pregnatriene A suspension of 10 g. of 6α-fluoromethyl-17α-hydroxy-4-pregnene-3,20-dione (VIIIa) in 150 ml. of acetic anhydride is stirred at about 40° C. with 1.5 g. of p-toluenesulfonic acid monohydrate for a period of about 10 hours. Then about 200 ml. of water is added slowly with ice-cooling and the mixture agitated until the excess acetic anhydride is destroyed. The crude crystalline precipitate is filtered, washed to neutrality with water and then washed with a small volume of methanol. This material consists of a mixture of, principally, 3,17α-diacetoxy-6α-fluoromethyl-3,5-pregnadien-20-one and a minor quantity of 3,17α,20 - triacetoxy - 6α - fluoromethyl - 3,5,20-pregnatriene. Recrystallization from a 1:1 mixture of dichloromethane and methanol yields a light colored, crystalline product, 3,17α-diacetoxy-6α-fluoromethyl-3,5-pregnadien-20-one.

Following the procedure of Example 11A, but substituting for acetic anhydride another lower-hydrocarbon carboxylic acid anhydride, e.g., wherein the acyl radical of the acylate group is one of those listed at the end of Example 10, yields the corresponding 3,17α-diacyloxy-6α - fluoromethyl - 3,5 - pregnadien - 20 - one and 3,17α, 20 - triacyloxy - 6α - fluoromethyl - 3,5,20 - pregnatriene.

EXAMPLE 11B 3,17α - diacetoxy - 6α - fluoromethyl - 3,5 - pregnadien-20 - one and 3,17α - triacetoxy - 6α - fluoromethyl-3,5,20-pregnatriene A suspension of 10 g. of 6α-fluoromethyl-17α-hydroxy-4-pregnene-3,20-dione 17-acetate (VIII) in 150 ml. of acetic anhydride is stirred with 2 g. of p-toluenesulfonic acid monohydrate at about 40° C. for a period of about 16 hours. About 200 ml. of water is then slowly added with cooling in an ice-bath and the mixture agitated until the excess acetic anhydride is destroyed. The crude crystalline precipitate is filtered, washed to neutrality with water and then washed with a small volume of methanol. This material consists of, principally, 3,17α-diacetoxy - 6α - fluoromethyl - 3,5 - pregnadien - 20 - one and a minor amount of 3,17α,20 - triacetoxy - 6α - fluoromethyl - 3,5,20-pregnatriene. Recrystallization from a 1:1 mixture of dichloromethane and methanol yields a light colored, crystalline product, 3,17α - diacetoxy - 6α - fluoromethyl-3,5-pregnadien-20-one.

Following the procedure of Example 11B, but substituting for acetic anhydride another lower-hydrocarbon carboxylic acid anhydride, e.g., wherein the acyl radical of the acylate group is one of those listed at the end of Example 10, yields the corresponding 3,17α-diacyloxy - 6α - fluoromethyl - 3,5 - pregnadien - 20 - one and 3,17α,20 - triacyloxy - 6α - fluoromethyl - 3,5,20-pregnatriene.

EXAMPLE 12

6-fluoromethyl-17α-hydroxy-4,6-pregnadiene-3,20-dione 17-acetate (IX)

1 g. of 6α-fluoromethyl-17α-hydroxy-4-pregnene-3,20-dione 17-acetate (VIII), 1.5 g. of recrystallized 2,3,5,6-tetrachloro-1,4-benzoquinone (chloranil) and 60 ml. of tertiary amyl alcohol were heated to boiling under nitrogen with a few boiling chips, and gently refluxed for a period of about 6 hours. The mixture was cooled and evaporated to dryness under reduced pressure. The solid residue (with the exception of some chloranil, which was insoluble) was dissolved in about 100 ml. of ether and filtered. The chloranil on the filter paper was washed with several portions of ether and the combined ether filtrates washed with 200 ml. portions of cold 2% sodium hydroxide. The ether filtrates were washed with cold water until the washings were neutral, then with saturated sodium chloride solution. The pooled ether solutions were dried over sodium sulfate and evaporated to dryness. The residue crystallized readily from cold acetone to yield pure light-colored crystalline 6-fluoromethyl-17α-hydroxy-4,6-pregnadiene-3,20-dione 17-acetate (IX).

The ester thus obtained can be hydrolyzed with potassium hydroxide or potassium carbonate in methanol or ethanol at room temperature in a nitrogen atmosphere to give free 6-fluoromethyl-17α-hydroxy-4,6-pregnadiene-3, 20-dione (IXa).

A solution composed of 1 g. of 6-fluoromethyl-17α-hydroxy-4,6-pregnadien-3,20-dione (IXa), 2.5 ml. of distilled acetic anhydride, 250 mg. of p-toluenesulfonic acid and 2.5 ml. of acetic acid was stirred for a period of about 90 minutes. The mixture was poured with vigorous stirring into water. The precipitated solid was separated by filtration, dried, chromatographed over Florisil with increasing proportions of acetone in Skellysolve B and recrystallized from ethyl acetate to yield light-colored 6-fluoromethyl - 17α - hydroxy - 4,6 - pregnadiene - 3,20-dione 17-acetate (IX).

Other 17-acylates are prepared in a like manner by substituting one of the lower-hydrocarbon carboxylic acid anhydrides listed in Example 10 instead of acetic anhydride.

EXAMPLE 12A 3,17α - diacetoxy - 6α - fluoromethyl - 3,5,7 - pregnatriene-20 - one and 3,17α,20 - triacetoxy - 6α - fluoromethyl-3,5,7,20-tetraene A suspension of 10 g. of 6α-fluoromethyl-17α-hydroxy-4,6-pregnadiene-3,20-dione 17-acetate (IX) in 150 ml. of acetic anhydride is stirred with 2 g. of p-toluenesulfonic acid monohydrate at about 40° C. for about 16 hours. About 200 ml. of water is then slowly added with cooling in an ice-bath and the mixture agitated until the excess acetic anhydride is destroyed. The crude crystalline precipitate is filtered, washed to neutrality with water and then washed with a small volume of methanol. This material consists of a mixture of, principally, 3,17α-diacetoxy-6α - fluoromethyl - 3,5,7 - pregnatriene - 20 - one and a minor quantity of 3,17α,20-triacetoxy-6α-fluoromethyl-3, 5,7,20-pregnatetraene. Recrystallization from a 1:1 mixture of dichloromethane and methanol yields a light colored, crystalline product, 3,17α-diacetoxy-6α-fluoromethyl-3,5,7-pregnatriene-20-one.

Following the procedure of Example 12A, but substituting for acetic anhydride another lower-hydrocarbon carboxylic acid anhydride, e.g., wherein the acyl radical of the acylate group is one of those listed at the end of Example 10, yields the corresponding 3,17α-diacyloxy-6α-fluoromethyl-3,5,7-pregnatriene-20-one and 3,17α,20-triacyloxy-6α-fluoromethyl-3,5,7,20-pregnatetraene.

EXAMPLE 13

6-fluoromethyl-17α-hydroxy-1,4,6-pregnatriene-3,20-dione 17-acetate (X)

Six 100-ml. portions of a medium in 250 ml. Erlenmeyer flasks containing 1% glucose, 2% corn steep liquor (60% solids) and tap water was adjusted to a pH of 4.9. This medium was sterilized for 45 minutes at fifteen pounds per square inch pressure and inoculated with a one to two day growth of Septomyxa affinis A.T.C.C. 6737. The Erlenmeyer flasks were shaken at room temperature at about 24° C. for a period of three days. At the end of this period, this 600 ml. volume was used as an inoculum for 10.1 of the same glucose corn steep liquor medium which, in addition, contained 10 ml. of an antifoam (a mixture of lard oil and octadecanol). The fermentor was placed into the water bath, adjusted to 28° C., and the contents stirred (300 r.p.m.) and aerated (0.5 l. air per minute/10 l. beer). After seventeen hours of incubation, when a good growth developed and the acidity rose to pH 6.7, 1 g. 6-fluoromethyl-17α-hydroxy-4,6-pregnadiene-3,20-dione (IXa) plus 0.5 g. of 3-ketobisnor-4-cholen-22-al, dissolved in 115 ml. of dimethylformamide, was added and the incubation (conversion) carried out at the same temperature and aeration for 24 hours (final pH 7.9). The mycelium was filtered off and the steroidal material was extracted with ethyl acetate to remove the bioconversion products. The ethyl acetate extract was washed with water, dried over sodium sulfate and evaporated to dryness. The residue was taken up in about 100 ml. of methylene chloride and chromatographed over a column of 120 g. of Florisil synthetic magnesium silicate. The products were eluted from the column with mixtures of 5 to 20% of acetone in Skellysolve B. The substances eluted by 20% in Skellysolve B consisted of partially purified products, which was further purified by recrystallization from acetone to give pure light-colored crystalline 6-fluoromethyl-17α-hydroxy-1,4,6-pregnatriene-3,20-dione (Xa).

A solution composed of 1 g. of 6-fluoromethyl-17α-hydroxy-1,4,6-pregnatriene-3,20-dione (Xa), 2.5 ml. of distilled acetic anhydride, 250 mg. of p-toluenesulfonic acid and 2.5 ml. of acetic acid was stirred for a period of about 90 minutes. The mixture was poured with vigorous stirring into water. The precipitated solid was separated by filtration, dried, chromatographed over Florisil with increasing proportions of acetone in Skellysolve B and recrystallized from ethyl acetate to yield light-colored 6-fluoromethyl - 17α-hydroxy-1,4,6-pregnatriene-3,20-dione 17-acetate (X).

Other 17-acylates are prepared in a like manner by substituting one of the lower-hydrocarbon carboxylic acid anhydrides listed in Example 10 in place of acetic anhydride.

EXAMPLE 14

*6-fluoromethyl-17α-hydroxy-1,4,6-pregnatriene-3,20-dione 17-acetate (X)*

A mixture of 100 milligrams of 6-fluoromethyl-17α-hydroxy-4,6-pregnadiene-3,20-dione 17-acetate (IX) dissolved in six milliliters of tertiary butyl alcohol and 0.55 milliliter of acetic acid was heated together with thirty milligrams of selenium dioxide to approximately 75 degrees centigrade with stirring for a period of about 24 hours. Thereafter another thirty-milligram portion of selenium dioxide was added and the mixture heated to 75 degrees centigrade under continuous stirring for a further period of 24 hours. The mixture was then cooled, filtered to remove the selenium dioxide and evaporated. The residue was chromatographed on a column of Florisil, eluted with mixtures of acetone and Skellysolve B and recrystallized from acetone-Skellysolve B hexanes four times to give pure 6-fluoromethyl-17α-hydroxy-1,4,6-pregnatriene-3,20-dione 17-acetate (X), a light-colored crystalline solid.

The ester thus obtained can be hydrolyzed with potassium hydroxide or potassium carbonate in methanol or ethanol at room temperature in an atmosphere of nitrogen to give free 6-fluoromethyl-17α-1,4,6-pregnatriene-3,20-dione (Xa).

A solution composed of 1 g. of 6-fluoromethyl-17α-hydroxy-1,4,6,-pregnatriene-3,20-dione (Xa), 2.5 ml. of distilled acetic anhydride, 250 mg. of p-toluenesulfonic acid and 2.5 ml. of acetic acid was stirred for about 90 minutes. The mixture was poured with vigorous stirring into water. The precipitated solid was separated by filtration, dried, chromatographed over Florisil with increasing proportions of acetone in Skellysolve B and recrystallized from ethyl acetate to yield light-colored 6-fluoromethyl - 17α-hydroxy-1,4,6-pregnatriene-3,20-dione 17-acetate (X).

Other 17-acylates are prepared in like manner by substituting one of the lower-hydrocarbon carboxylic acids listed in Example 10 instead of acetic anhydride.

EXAMPLE 15

*6-fluoromethyl-17α-hydroxy-1,4,6-pregnatriene-3,20-dione 17-acetate (X)*

1 g. of 6α-fluoromethyl-17α-hydroxy-1,4-pregnadiene-3,20-dione 17-acetate (VII), 1.5 g. of recrystallized 2,3,5,6-tetrachloro-1,4-benzoquinone (chloranil) and 60 ml. of tertiary amyl alcohol were heated to boiling under nitrogen with a few boiling chips, and gently refluxed for a period of about 6 hours. The mixture was cooled and evaporated to dryness under reduced pressure. The solid residue (with the exception of some chloranil, which was insoluble) was dissolved in about 100 ml. of ether and filtered. The chloranil on the filter paper was washed with several portions of ether and the combined ether filtrates washed with 200 ml. portions of cold 2% sodium hydroxide. The ether filtrates were washed with cold water until the washings were neutral, then with saturated sodium chloride solution. The pooled ether solutions were dried over sodium sulfate and evaporated to dryness. The residue crystallized readily from cold acetone to yield pure light-colored crystalline 6α-fluoromethyl-17α - hydroxy - 1,4,6-pregnatriene-3,20-dione 17-acetate (X).

The ester thus obtained can be hydrolyzed with postassium hydroxide or potassium carbonate in methanol or ethanol at room temperature in a nitrogen atmosphere to give free 6-fluoromethyl-17α-hydroxy-1,4,6-pregnatriene-3,20-dione (Xa).

A solution of 1 g. of 6-fluoromethyl-17α-hydroxy-1,4,6-pregnatriene-3,20-dione (Xa), 2.5 ml. of distilled acetic anhydride, 250 mg. of p-toluenesulfonic acid and 2.5 ml. of acetic acid was stirred for about 90 minutes. The mixture was poured with vigorous stirring into water. The precipitated solid was separated by filtration, dried, chromatographed over Florisil with increasing proportions of acetone in Skellysolve B and recrystallized from ethyl acetate to yield light-colored 6-fluoromethyl-17α - hydroxy - 1,4,6-pregnatriene-3,20-dione 17-acetate (X).

Other 17-acylates are prepared in like manner by substituting one of the lower-hydrocarbon carboxylic acids listed in Example 10 instead of acetic anhydride.

While the compounds prepared in Examples 1 to 15 are 3,17-diacetates and 17-acetates, other 3,17-diacylates and 17-acylates of these compounds can be prepared in a similar manner by substituting as the starting material a corresponding 3,17-diacylate and 17-acylate other than the 3,17-diacetate and 17-acetate, wherein the acyl radical is, e.g., that of a lower-hydrocarbon carboxylic acid named in Example 10.

We claim:
1. A compound of the formula

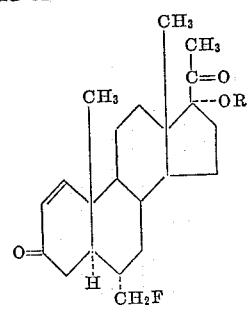

wherein R is selected from the group consisting of hydrogen and the acyl radical of a hydrocarbon carboxylic acid containing from one to twelve carbon atoms, inclusive.

2. 1-dehydro-6α-fluoromethyl-17α-hydroxy-5α-pregnane-3,20-dione 17-acetate.

References Cited

UNITED STATES PATENTS

| | | | |
|---|---|---|---|
| 3,036,098 | 5/1962 | Bowers et al. | 260—397.45 |
| 3,052,676 | 9/1962 | Zderic et al. | 260—239.55 |
| 3,087,941 | 4/1963 | Engel | 260—239.55 |
| 3,178,411 | 4/1965 | Beal et al. | 260—239.55 |

LEWIS GOTTS, *Primary Examiner.*

ELBERT L. ROBERTS, *Examiner.*

J. R. BROWN, *Assistant Examiner.*

UNITED STATES PATENT OFFICE
CERTIFICATE OF CORRECTION

Patent No. 3,341,560                                    September 12, 1967

J. Allan Campbell et al.

It is hereby certified that error appears in the above numbered patent requiring correction and that the said Letters Patent should read as corrected below.

Column 6, line 11, "N-methylene" should read -- 6-methylene --. Column 9, line 45, "$C_{28}$" should read -- $C_{26}$ --. column 10, line 43, "41 or 10%" should read -- 4 1. of 10% --; line 62, "(IV)" should read -- (VI) --. Column 11, line 33, "(ε=9,125)" should read -- (ε=16,250) --. Column 12, line 62, "4.0" should read -- 4.9 --. Column 16, line 70, "ATCC (S. olivaceous)" should read -- ATCC 3352 (S. olivaceous) --. Column 17, line 42, "3,17α" should read -- 3,17α,20- --. Column 19, line 2, "10.1" should read -- 10 1. --; line 9, "1 g. 6-" should read -- 1 g. of 6- --; line 67, "-17α-1,4,6-" should read -- -17α-hydroxy-1,4,6- --.

Signed and sealed this 29th day of July 1969.

(SEAL)
Attest:

EDWARD M. FLETCHER, JR.                        WILLIAM E. SCHUYLER, JR.
Attesting Officer                                Commissioner of Patents